(12) United States Patent
Mori et al.

(10) Patent No.: US 9,124,138 B2
(45) Date of Patent: Sep. 1, 2015

(54) POWER GRID OPERATION CONTROL SYSTEM, DEVICE, AND METHOD

(75) Inventors: Shigeki Mori, Hitachinaka (JP); Yuuta Gima, Yonabaru (JP); Ryuta Kinjo, Chatan (JP); Fumihiro Shinjo, Urasoe (JP); Yasunori Uezu, Itoman (JP); Eiichiro Kagawa, Ginowan (JP)

(73) Assignees: HITACHI, LTD., Tokyo (JP); THE OKINAWA ELECTRIC POWER COMPANY, INCORPORATED, Okinawa (JP); OKINAWA NEW ENERGY DEVELOPMENT CO., INC., Okinawa (JP); THE OKIDEN GLOBAL SYSTEMS COMPANY, INCORPORATED, Okinawa (JP)

( * ) Notice: Subject to any disclaimer, the term of this patent is extended or adjusted under 35 U.S.C. 154(b) by 653 days.

(21) Appl. No.: 13/420,838

(22) Filed: Mar. 15, 2012

(65) Prior Publication Data

US 2013/0002032 A1 Jan. 3, 2013

(30) Foreign Application Priority Data

Jun. 28, 2011 (JP) ................................. 2011-142790

(51) Int. Cl.
*H02J 3/00* (2006.01)
*H02J 3/38* (2006.01)
*H02J 3/34* (2006.01)

(52) U.S. Cl.
CPC . *H02J 3/382* (2013.01); *H02J 3/34* (2013.01); *H02J 2003/007* (2013.01); *Y02E 60/76* (2013.01); *Y04S 40/22* (2013.01); *Y10T 307/718* (2015.04)

(58) Field of Classification Search
USPC .......................................................... 307/84
See application file for complete search history.

(56) References Cited

U.S. PATENT DOCUMENTS

2008/0224670 A1* 9/2008 Liu et al. ........................... 322/7

FOREIGN PATENT DOCUMENTS

| JP | 2001-234845 | 8/2001 |
|----|----|----|
| JP | 2009-213240 | 9/2009 |
| JP | 4559577 | 7/2010 |

OTHER PUBLICATIONS

Japanese Office Action for Application No. JP2011-142790, (Mailed Oct. 23, 2012), and a partial English language translation of office action.

(Continued)

*Primary Examiner* — Rexford Barnie
*Assistant Examiner* — Dru Parries
(74) *Attorney, Agent, or Firm* — Baker Botts L.L.P.

(57) ABSTRACT

A power grid operation control system, device, and method for steadily operating a power grid while making the most of renewable energy. The power grid operation control system serves a power grid connected to a plurality of renewable energy and a plurality of thermal/hydroelectric power generators, and includes an automatic dispatching system, which controls the thermal/hydroelectric power generators, and a renewable energy generation control system, which controls the renewable energy. The automatic dispatching system controls the thermal/hydroelectric power generators by generating an automatic frequency control signal for correcting the power supply and demand imbalance of the power grid. The renewable energy generation control system determines an available connection capability and issues load instructions to ensure that the total power generation capacity of the renewable energy does not exceed the available connection capability.

7 Claims, 5 Drawing Sheets

(56) References Cited

OTHER PUBLICATIONS

Japanese Office for Application No. JP2011-142790, (mailed Dec. 18, 2012), and a partial English language translation of office action.

Saito, Tetsuo; "Wind-power generation and power system control in Spain", Windows of Wind; pp. 63-68; Jul. 2009, Japan Wind Power Association (search on Oct. 16, 2012) (http://jwpa.jp/2011_pdf/09-17mado.pdf; and English language translation.

"Official announcement of the amount of interconnectable wind-generated power in power systems on the main island of Okinawa (provisional value) and temporary halt of inquiry and application of interconnection", Press Release (online), Feb. 17, 2006, Okinawa Electric Power Co., Ltd. Inc. (searched Oct. 16, 2012); http://www.okiden.co.jp/shared/pdf/news_release/2006/060217.pdf; and English language translation.

Japanese Patent Office Action for Application No. JP2011-142790, mailed Jul. 16, 2013, and English language translation of office action.

"Powering Europe: wind energy and the electricity grid", Nov. 2010, A report y the European Wind Energy Association; http://www.ewea.org/fileadmin/ewea_documents/documents/publications/reports/Grids_Report)2010.pdf.

"Powering Europe: wind energy and the electricity grid", Feb. 15, 2012, Japan Wind Energy Association: European Wind Energy Association (translated by Japan Wind Energy Association): http://www.jwea.or.jp/publicaiton/PoweringEuropeJP.pdf.

"A report on the introduction of a large column of new energy and actions for stabilization of power system in Europe", Apr. 2009; http://www.meti.go.jp/committee/materials2/downloadfiles/g90522a09j.pdf; and partial English translation thereof.

"Normal/Emergency Load Frequency Control in Power grid" by Power grid Technical Committee of Electric Power Energy Division of the Institute of Electrical Engineers of Japan (Technical report of the Institute of Electrical Engineers of Japan, No. 869.

Communication issued in connection with corresponding Japanese Patent Application No. 2014-004025, dated Sep. 24, 2014.

* cited by examiner

| | AT 0:00 | AT 1:00 | AT 2:00 | AT 3:00 | AT 4:00 | ... 32 | AT 22:00 | AT 23:00 |
|---|---|---|---|---|---|---|---|---|
| PATTERN 1 | $E1_{00}, L1_{00}$ | $E1_{01}, L1_{01}$ | $E1_{02}, L1_{02}$ | $E1_{03}, L1_{03}$ | $E1_{04}, L1_{04}$ | | $E1_{22}, L1_{22}$ | $E1_{23}, L1_{23}$ |
| PATTERN 2 | $E2_{00}, L2_{00}$ | $E2_{01}, L2_{01}$ | $E2_{02}, L2_{02}$ | $E2_{03}, L2_{03}$ | $E2_{04}, L2_{04}$ | | $E2_{22}, L2_{22}$ | $E2_{23}, L2_{23}$ |
| PATTERN 3 | $E3_{00}, L3_{00}$ | $E3_{01}, L3_{01}$ | $E3_{02}, L3_{02}$ | $E3_{03}, L3_{03}$ | $E3_{04}, L3_{04}$ | | $E3_{22}, L3_{22}$ | $E3_{23}, L3_{23}$ |
| PATTERN 4 | $E4_{00}, L4_{00}$ | $E4_{01}, L4_{01}$ | $E4_{02}, L4_{02}$ | $E4_{03}, L4_{03}$ | $E4_{04}, L4_{04}$ | | $E4_{22}, L4_{22}$ | $E4_{23}, L4_{23}$ |
| PATTERN 5 | $E5_{00}, L5_{00}$ | $E5_{01}, L5_{01}$ | $E5_{02}, L5_{02}$ | $E5_{03}, L5_{03}$ | $E5_{04}, L5_{04}$ | | $E5_{22}, L5_{22}$ | $E5_{23}, L5_{23}$ |
| ⋮ | | | | | | | | |
| PATTERN N | $EN_{00}, LN_{00}$ | $EN_{01}, LN_{01}$ | $EN_{02}, LN_{02}$ | $EN_{03}, LN_{03}$ | $EN_{04}, LN_{04}$ | | $EN_{22}, LN_{22}$ | $EN_{23}, LN_{23}$ |

FIG. 4

| | 11 |
|---|---|
| GENERATOR 1 | G1 |
| GENERATOR 2 | G2 |
| GENERATOR 3 | G3 |
| GENERATOR 4 | G4 |
| ⋮ | ⋮ |
| GENERATOR M | Gm |

FIG. 5

| | AT 0:00 | AT 1:00 | AT 2:00 | AT 3:00 | AT 4:00 | AT 5:00 | AT 6:00 | ... | AT 22:00 | AT 23:00 |
|---|---|---|---|---|---|---|---|---|---|---|
| GENERATOR 1 | STOPPED | STOPPED | STOPPED | STOPPED | STOPPED | OPERATED | OPERATED | | STOPPED | STOPPED |
| GENERATOR 2 | OPERATED | OPERATED | OPERATED | OPERATED | OPERATED | OPERATED | OPERATED | | OPERATED | OPERATED |
| GENERATOR 3 | OPERATED | OPERATED | OPERATED | OPERATED | OPERATED | OPERATED | OPERATED | | STOPPED | STOPPED |
| GENERATOR 4 | STOPPED | STOPPED | STOPPED | STOPPED | STOPPED | STOPPED | STOPPED | | STOPPED | STOPPED |
| ... | | | | | | | | | | |
| GENERATOR M | STOPPED | STOPPED | STOPPED | STOPPED | STOPPED | STOPPED | OPERATED | | OPERATED | OPERATED |

POWER GRID OPERATION CONTROL SYSTEM, DEVICE, AND METHOD

CLAIM OF PRIORITY

The present application claims priority from Japanese Patent application serial no. 2011-142790, filed on Jun. 28, 2011, the content of which is hereby incorporated by reference into this application.

FIELD OF THE INVENTION

The present invention relates to a power grid operation control system, device, and method, and more particularly to an operation control system, device, and method for a power to which a plurality of wind turbine generators, photovoltaic power generation, or other generators based on renewable energy are connected for operation purposes.

BACKGROUND OF THE INVENTION

In recent years, power grids have increasingly used wind turbine generators, photovoltaic power generation, or other generators based on renewable energy. It is demanded that such power grids make effective use of electrical power generated by renewable energy.

However, when a generator based on renewable energy is used, the amount of electrical power generated by such a generator varies with solar radiation, wind conditions, and other weather conditions that are difficult to predict accurately. This causes power supply and demand imbalance. This imbalance causes fluctuation in system frequency, thereby incurring power quality deterioration.

In general, an energy storage battery is added to each unit or a plurality of units of a renewable energy in order to inhibit generated electrical power from varying with the weather conditions. The energy storage battery compensates for deficiency of generated electrical power or sharp output changes in the renewable energy that are caused by changes in the weather conditions. In this instance, it is ideal that an energy storage battery capable of compensating for the whole output change in the renewable energy be added. However, such an energy storage battery costs too much, thereby increasing the unit cost of renewable energy system power generation.

As described above, at a site where generators based on renewable energy are installed, every effort is made, wherever possible, to suppress or absorb changes in generated electrical power that are caused by the changes in the weather conditions. However, changes in the generated electrical power that cannot be suppressed or absorbed are to be compensated for by existing thermal power generators and hydroelectric power generators included in an employed power grid. More specifically, the existing thermal power generators and hydroelectric power generators receive an automatic frequency control signal (AFC signal) from an automatic dispatching system and functions to absorb changes in the electrical power generated by the generators based on renewable energy.

However, when the proportion of the renewable energy based generators increases within the power grid, the capacity furnished by the existing thermal power generators and hydroelectric power generators becomes insufficient.

"Normal/Emergency Load Frequency Control in Power grid" by Power grid Technical Committee of Electrical Power Energy Division of the Institute of Electrical Engineers of Japan (Technical Report of the Institute of Electrical Engineers of Japan, No. 869) describes a method for determining an available wind turbine generator connection capability interconnectable to the power grid from the relationship between a power capacity providable by existing thermal power generators and hydroelectric power generators and the power generation capacity of renewable energy based generators that varies with weather conditions.

Japanese Patent No. 4559577 discloses a control method for selecting a wind turbine generator exhibiting a significant output fluctuation from a plurality of wind turbine generators and suppressing the output of the selected wind turbine generator to smooth the power outputs of the wind turbine generators. If the utilization factors of the wind turbine generators that prevail during a predetermined period are calculated and the utilization factor of a particular wind turbine generator is found to be lower than a threshold value, the control method is exercised to make the utilization factors of all the wind turbine generators nearly equal by excluding the particular wind turbine generator from wind turbine generators to be subjected to output suppression.

In a power grid that is operated while a plurality of wind turbine generators, photovoltaic power generation, and other renewable energy based generators are connected, it is desired that the power grid be steadily operated while making the most of the renewable energy based generators.

However, even when the method described in Japanese Patent No. 4559577 is exercised after the method described in "Normal/Emergency Load Frequency Control in Power grid" by Power grid Technical Committee of Electrical Power Energy Division of the Institute of Electrical Engineers of Japan (Technical Report of the Institute of Electrical Engineers of Japan, No. 869) is used to determine the available wind turbine generator connection capability interconnectable to the power grid, the power grid cannot be steadily operated while making the most of the renewable energy based generators.

There are various problems with the determination of the available wind turbine generator connection capability. When, for instance, the available wind turbine generator connection capability is calculated in a power grid state where the demand is lowest (e.g., in winter), basic information (allowable control deviation, available control capability, and load fluctuation) for determining the available wind turbine generator connection capability is different from the basic information for another power grid state where the demand is high (e.g., in summer). Further, although the available wind turbine generator connection capability is constantly changing due to the occurrence of system faults and changes in the load fluctuation of users connected to the power grid, the wind turbine generator connection capability becomes excessive or inadequate.

Furthermore, the electrical power generated by a wind turbine generator depends on weather conditions so that a time zone where the wind turbine generator can be operated at full rated capacity is extremely limited. Therefore, even when the capacity of a system-interconnected wind turbine generator is made lower than the available wind turbine generator connection capability, the wind turbine generator is always operated at a capacity lower than the available wind turbine generator connection capability due to the weather conditions. This makes it impossible to make effective use of the renewable energy. For example, even if the total rated power generation capacity of a plurality of system-interconnected wind turbine generators is suppressed to 90%, which is not higher than the available wind turbine generator connection capability, the rated power generation output of the wind turbine generators cannot always be obtained due to the weather conditions. Hence, the wind turbine generators are operated at 50% of their capacity, which is lower than the available wind turbine generator connection capability. This makes it impossible to make the most of the renewable energy.

Moreover, the renewable energy can be effectively used when the overall output fluctuation of all renewable energy is suppressed instead of operating the renewable energy in such a manner as to suppress the output fluctuation of each renewable energy. However, such an overall control scheme is not described in Japanese Patent No. 4559577.

The present invention has been made in view of the above circumstances and provides a power grid operation control system, device, and method for steadily operating a power grid while making the most of renewable energy.

SUMMARY OF THE INVENTION

According to a first aspect of the present invention, there is provided a power grid operation control system for a power grid connected to a plurality of renewable energy and a plurality of thermal/hydroelectric power generators. The power grid operation control system includes an automatic dispatching system, which controls the thermal/hydroelectric power generators, and a renewable energy generation control system, which controls the renewable energy. The automatic dispatching system controls the thermal/hydroelectric power generators by generating an automatic frequency control signal for correcting the power supply and demand imbalance of the power grid. The renewable energy generation control system determines an available connection capability, which is the power generation capacity of the renewable energy connectable to the power grid, by using the load fluctuation of the renewable energy due to weather condition changes and the system capacity providable by the thermal/hydroelectric power generators, issues individual load dispatching instructions to the renewable energy to ensure that the total power generation capacity of the renewable energy does not exceed the available connection capability, and acquires basic information for determining the available connection capability in coordination with the automatic dispatching system.

According to a second aspect of the present invention, there is provided the power grid operation control system as described in the first aspect, wherein the renewable energy generation control system stops the renewable energy upon receipt of information about a fault in the power grid from the automatic dispatching system, and when the electrical power supplied from the power grid is insufficient, exercises fixed output discharge control with energy storage batteries provided for the renewable energy.

According to a third aspect of the present invention, there is provided a power grid operation control device for a power grid connected to a plurality of generators based on renewable energy and thermal/hydroelectric power generators whose electrical power generation is controlled when a frequency control signal based on power supply and demand imbalance is received from an automatic dispatching system. Each of the generators based on renewable energy are equipped with a controller that controls the electrical power generation thereof. The power grid operation control device includes a renewable energy generation control system that issues a load dispatching instruction to the controller. The renewable energy generation control system includes a first unit and a second unit. The first unit determines an available connection capability, which is the power generation capacity of the renewable energy connectable to the power grid, by using the load fluctuation of the renewable energy due to weather condition changes and the system capacity providable by the thermal/hydroelectric power generators. When the total power generation capacity of the renewable energy connected to the power grid is not lower than the available connection capability, the second unit issues the load dispatching instruction to the renewable energy to ensure that the total power generation capacity does not exceed the available connection capability.

According to a fourth aspect of the present invention, there is provided the power grid operation control device as described in the third aspect, wherein basic information for enabling the first unit to determine the available connection capability is acquired as time zone specific information about a daily operation.

According to a fifth aspect of the present invention, there is provided the power grid operation control device as described in the fourth aspect, wherein the basic information includes an available control capability, which is an output adjustment range of the thermal/hydroelectric power generators whose output can be changed by the load dispatching instruction based on a frequency control signal, and is acquired as the time zone specific information about a daily operation.

According to a sixth aspect of the present invention, there is provided the power grid operation control device as described in any one of the third to fifth aspects, wherein the utilization factor of each renewable energy that prevails during a predetermined period is calculated to operate generators other than a generator having a low utilization factor in such a manner that the total power generation capacity does not exceed the available connection capability.

According to a seven aspect of the present invention, there is provided a power grid operation control method for a power grid connected to a plurality of generators based on renewable energy and thermal/hydroelectric power generators whose electrical power generation is controlled by a frequency control signal based on power supply and demand imbalance. The power grid operation control method including the steps of: determining an available connection capability, which is the power generation capacity of the renewable energy connectable to the power grid, by using the load fluctuation of the renewable energy due to weather condition changes and the system capacity providable by the thermal/hydroelectric power generators; and controlling the renewable energy connected to the power grid by determining individual load dispatching instructions for ensuring that the total power generation capacity of the renewable energy does not exceed the available connection capability.

According to the above-described aspects of the present invention, the overall output fluctuation of renewable energy (e.g., wind turbine generators and photovoltaic power generation) can be effectively suppressed and controlled. This makes it possible to contribute to the correction of power supply and demand imbalance of the power grid, improve the utilization factor of each renewable energy, and increase the amount of renewable energy introduction into the power grid.

DETAILED DESCRIPTION OF THE PREFERRED EMBODIMENTS

An embodiment of the present invention will now be described.

Figure 2:
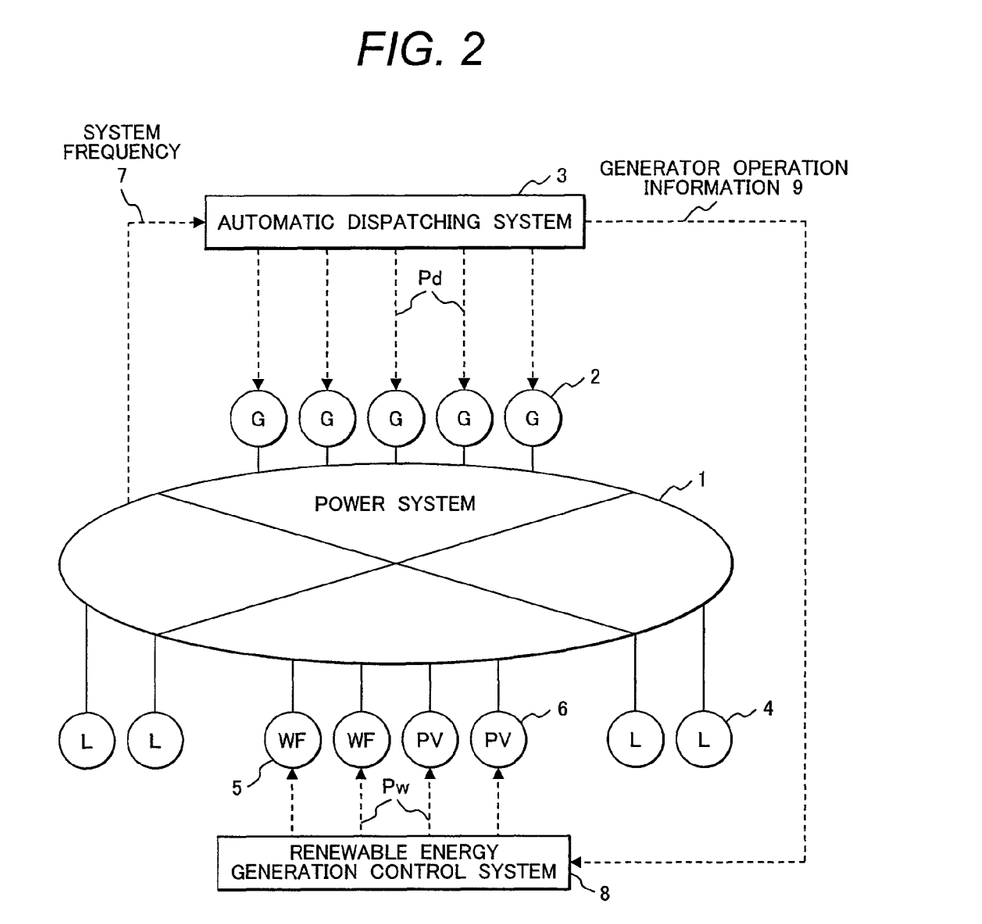
FIG. 2 is a diagram illustrating a power grid operation control system applied to a power grid including renewable energy.

FIG. 2 shows a configuration of a power grid operation control system applied to a power grid including renewable energy. Referring to FIG. 2, the power grid 1 includes renewable energy, such as wind turbine generators 5 and photovoltaic power generation 6, in addition to existing generators 2, such as thermal, hydroelectric, or nuclear power generators, and supplies electrical power generated by the generators to loads 4 (users) through transmission lines, transformers, and the like.

To control the power grid 1, an automatic dispatching system 3 determines the difference between the demand of the loads 4 connected to the power grid 1 and the amount of electrical power generated by the existing generators 2 such as the thermal, hydroelectric, or nuclear power generators, and issues an output change instruction Pd to the existing generators 2 such as the thermal, hydroelectric, or nuclear power generators for the purpose of compensating for the determined difference. More specifically, a system frequency 7 is acquired from the power grid 1 to calculate an imbalance amount required to make the system frequency 7 constant. As the nuclear power generators are usually operated at a fixed load, the output change instruction Pd is issued to the thermal/hydroelectric power generators. It is assumed that the output change instruction Pd includes an automatic frequency control signal (AFC signal).

The power grid operation control system according to the present embodiment includes a renewable energy generation control system 8, which monitors and controls the wind turbine generators 5 and photovoltaic power generation 6, in addition to the above-described existing control system (automatic dispatching system). The renewable energy generation control system 8 issues a load dispatching instruction value Pw to each renewable energy 5, 6 for comprehensive management purposes. Further, a means of communication is provided between the automatic dispatching system 3 and the renewable energy generation control system 8 to receive generator operation information 9.

As described above, the operation control system according to the present embodiment includes the automatic dispatching system 3 and the renewable energy generation control system 8 with respect to the power grid including the renewable energy generators 5, 6. The operation control system causes the automatic dispatching system 3 to provide automatic frequency control of the existing thermal/hydroelectric power generators 2 and causes the renewable energy generation control system 8 to control the renewable energy generators 5, 6 in accordance with an idea of power generation suppression control. To exercise control as described above, the operation control system operates the automatic dispatching system 3 and the renewable energy generation control system 8 in a coordinated manner.

Figure 1:
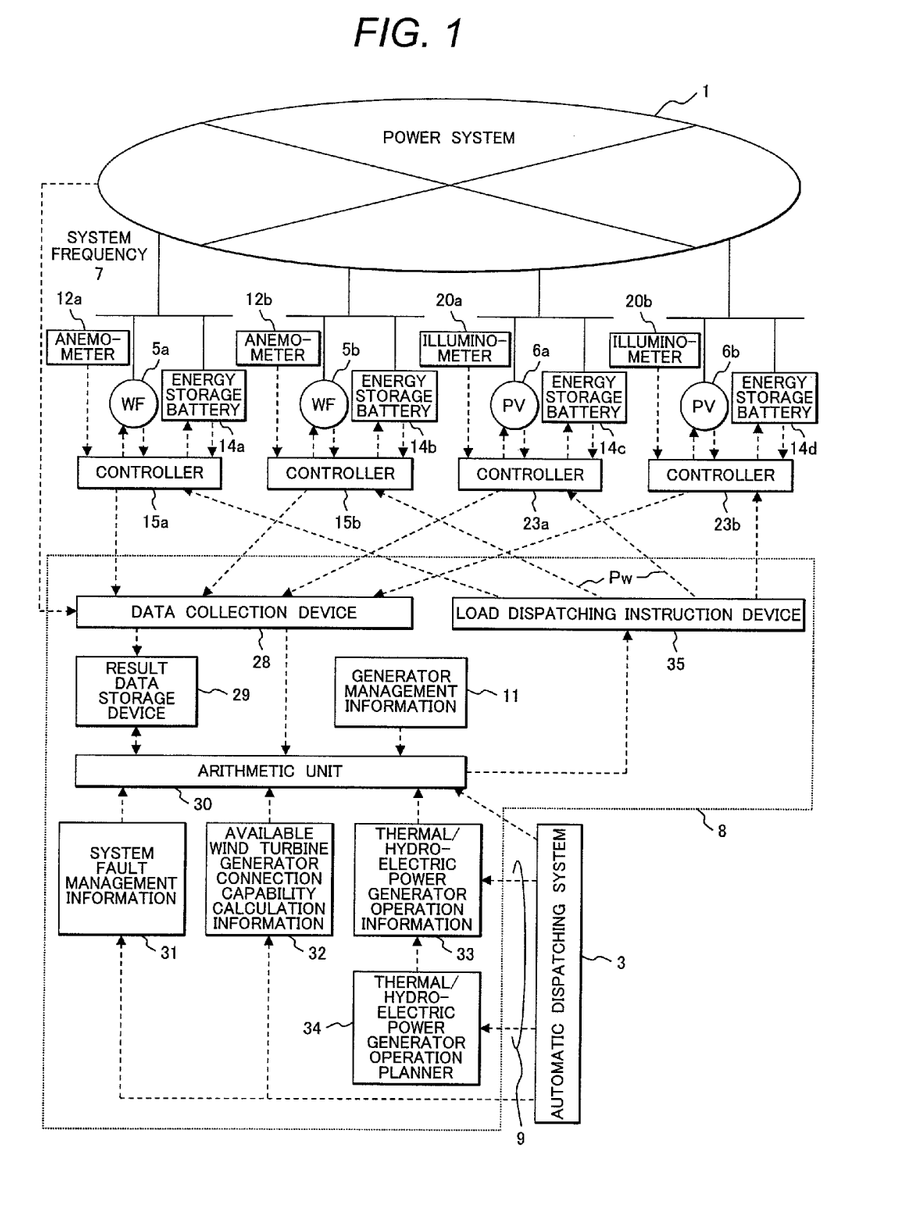
FIG. 1 is a diagram illustrating a detailed configuration of a renewable energy generation control system 8 and renewable energy side devices.

FIG. 1 shows a detailed configuration of the renewable energy generation control system 8 and renewable energy side devices.

As regards the renewable energy side devices, each wind turbine generator 5 includes an anemometer 12 to measure the velocity of wind. When an energy storage battery 14 is included, charging/discharging control is exercised as needed to stabilize the electrical power to be transmitted. In accordance with a load dispatching instruction Pw issued by a load dispatching instruction device 35 in the renewable energy generation control system 8, a wind turbine generator controller 15 exercises output control, for instance, by adjusting the variable blade angle of a wind turbine and transmits air volume, blade angle, and other relevant data to a data collection device 28 in the renewable energy generation control system 8.

Each photovoltaic power generation 6 includes an illuminometer 20 to measure illuminance. When an energy storage battery 14 is included, charging/discharging control is exercised as needed to stabilize the electrical power to be transmitted. In accordance with a load dispatching instruction Pw issued by the load dispatching instruction device 35 in the renewable energy generation control system 8, a photovoltaic power generation controller 23 exercises output control, for instance, by adjusting an electrical power converter and transmits illuminance and other relevant data to the data collection device 28 in the renewable energy generation control system 8. It should be noted that a plurality of wind turbine generators 5 are usually used, and that each photovoltaic power generation 6 may include a plurality of photovoltaic cells.

Meanwhile, the renewable energy generation control system 8 includes an arithmetic unit 30 as a core unit. The arithmetic unit 30 acquires control target measurement information, such as generated electrical power, wind velocity, and illuminance, from the controllers 15 for the wind turbine generators 5 and the controllers 23 for the photovoltaic power generation 6 through the data collection device 28. The data acquired from the data collection device 28 or the data computed by the arithmetic unit 30 is stored in a result data storage device 29.

In addition to the measurement information from the control target side, the arithmetic unit 30 acquires generator management information 11, system fault management information 31, available wind turbine generator connection capability calculation information 32, and thermal/hydroelectric power generator operation information 33 as basic information for operating the renewable energy generators 5, 6. The arithmetic unit 30 uses the measurement information and basic information to calculate an output change request amount for the wind turbine generators 5 and photovoltaic power generation 6. The output change request amount calculated by the arithmetic unit 30 represents the sum of load dispatching instruction values for the individual generators 5, 6. The load dispatching instruction values Pw, which represent the allocations of the output change request amount, are transmitted to the wind turbine generators 5 and photovoltaic power generation 6 through the load dispatching instruction device 35. The generator management information 11 is the device information about the wind turbine generators 5 and photovoltaic power generation 6 monitored and controlled by the renewable energy generation control system 8.

The system fault management information 31, the available wind turbine generator connection capability calculation information 32, and the thermal/hydroelectric power generator operation information 33, which will be described in detail later, are generated in accordance with generator operation information 9 generated from the automatic dispatching system 3. The thermal/hydroelectric power generator operation information 33 may be generated from information that is obtained when the information generated from the automatic dispatching system 3 is given to a thermal/hydroelectric power generator operation planner 34. Some of these items of information may be prepared in advance and stored in the renewable energy generation control system 8.

As described with reference to FIGS. 1 and 2, the automatic dispatching system 3 not only controls the thermal/hydroelectric power generators 2 by generating the output change instruction Pd for the purpose of exercising control to maintain a constant system frequency 7 of the power grid, but also transmits the generator operation information 9 about currently operating thermal/hydroelectric power generators 2 to the renewable energy generation control system 8. The renewable energy generation control system 8 stores the received generator operation information 9, for instance, as the thermal/hydroelectric power generator operation information 33. Specifically, the generator operation information 9 includes constantly changing information such as a daily load curve prepared by the automatic dispatching system 3, a time-specific generation request signal, an automatic frequency control signal (AFC signal), and a load signal.

If it is difficult to constantly keep an information transmission path between the automatic dispatching system 3 and the renewable energy generation control system 8 for the purpose, for instance, of assuring information transmission path security and reducing the communications traffic, it is possible to receive in advance an unit commitment of the thermal/hydroelectric power generators 2, such as a daily load curve, and register the received unit commitment in the thermal/hydroelectric power generator operation planner 34 for the renewable energy generation control system 8. The thermal/hydroelectric power generator operation planner 34 reproduces constantly changing information, such as a time-specific generation request signal, an automatic frequency control signal (AFC signal), and a load signal, and gives such information, for instance, to a unit that handles the thermal/hydroelectric power generator operation information 33.

The arithmetic unit 30 dynamically calculate an available wind turbine generator connection capability by using the above-mentioned input information and Equation (1), which is disclosed, for instance, in "Normal/Emergency Load Frequency Control in Power grid" by Power grid Technical Committee of Electrical Power Energy Division of the Institute of Electrical Engineers of Japan (Technical Report of the Institute of Electrical Engineers of Japan, No. 869). Here, to "dynamically calculate" is, for example, to perform calculations at each point of time to determine an optimal amount at each point of time. In the following description, it is assumed that wind turbine generators are used as the renewable energy. However, the following description is also applicable to a case where photovoltaic power generation are used in place of the wind turbine generators and a case where photovoltaic power generation and wind turbine generators are both used as the renewable energy.

Available wind turbine generator connection capability ≤

$$\frac{\sqrt{Emax^2 + G^2 - L^2}}{R} \quad (1)$$

Equation (1) will now be described with reference to a case where automatic frequency control (AFC) for the correction of supply and demand imbalance is exercised for a period of not longer than 20 minutes.

Emax is an allowable control deviation. The allowable control deviation Emax is a permissible value at which power quality is maintained even when supply and demand imbalance cannot be corrected within a short period of time. If, for instance, a permissible deviation from a reference frequency (50 Hz or 60 Hz), which is a target value for power quality assurance, is ±0.3 Hz, the allowable control deviation for a power grid handling a demand of 10,000 MW is ±300 MW. As described above, the allowable control deviation Emax is proportionally determined when the demand is determined.

G is an available control capability. The available control capability is an output adjustment range, for instance, of thermal/hydroelectric power generators whose output can be changed by load dispatching instructions for automatic frequency control. In the current example, it is assumed that the available control capability is ±100 MW. In Equation (1), a portion determined by the sum of the allowable control deviation and available control capability denotes an allowable load fluctuation for the power grid. It is a system capacity providable by the thermal/hydroelectric power generators.

L is a load fluctuation. The load fluctuation is the range of unpredictable load fluctuation of the demand. In the current example, it is assumed that the load fluctuation is ±200 MW.

R is a wind turbine generator fluctuation ratio. The wind turbine generator fluctuation ratio is the range of fluctuations relative to a rated output. In the current example, it is assumed that the wind turbine generator fluctuation ratio is 50% (0.5). In Equation (1), a term determined by the load fluctuation and wind turbine generator fluctuation ratio denotes a load fluctuation, which represents a disturbance. Therefore, it is important for stable power grid operations that the load fluctuation, which represents a disturbance, is smaller than the aforementioned allowable load fluctuation.

When the available wind turbine generator connection capability for the above-described power grid is determined from Equation (1), the determined available wind turbine generator connection capability ≤490 MW. It means that the maximum rated capacity is 490 MW when wind turbine generators are system-interconnected. In other words, when the total power generation capacity of all wind turbine generators is close to, but not greater than, 490 MW, the renewable energy can be utilized to the fullest while the power grid is stabilized.

Figure 3:
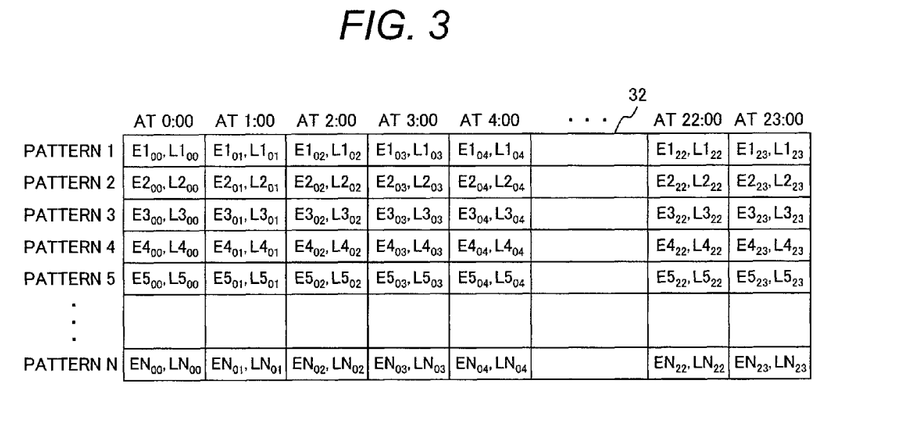
FIG. 3 is a diagram illustrating exemplary contents of available wind turbine generator connection capability calculation information 32.
Figure 4:
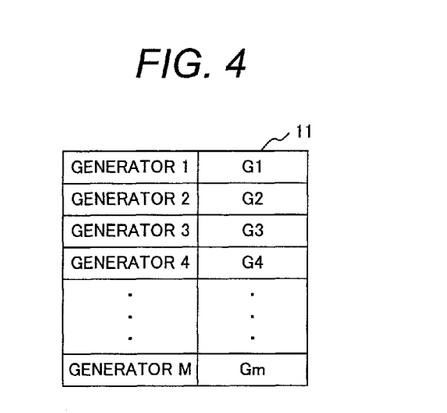
FIG. 4 is a diagram illustrating exemplary contents of generator management information 11.
Figure 5:
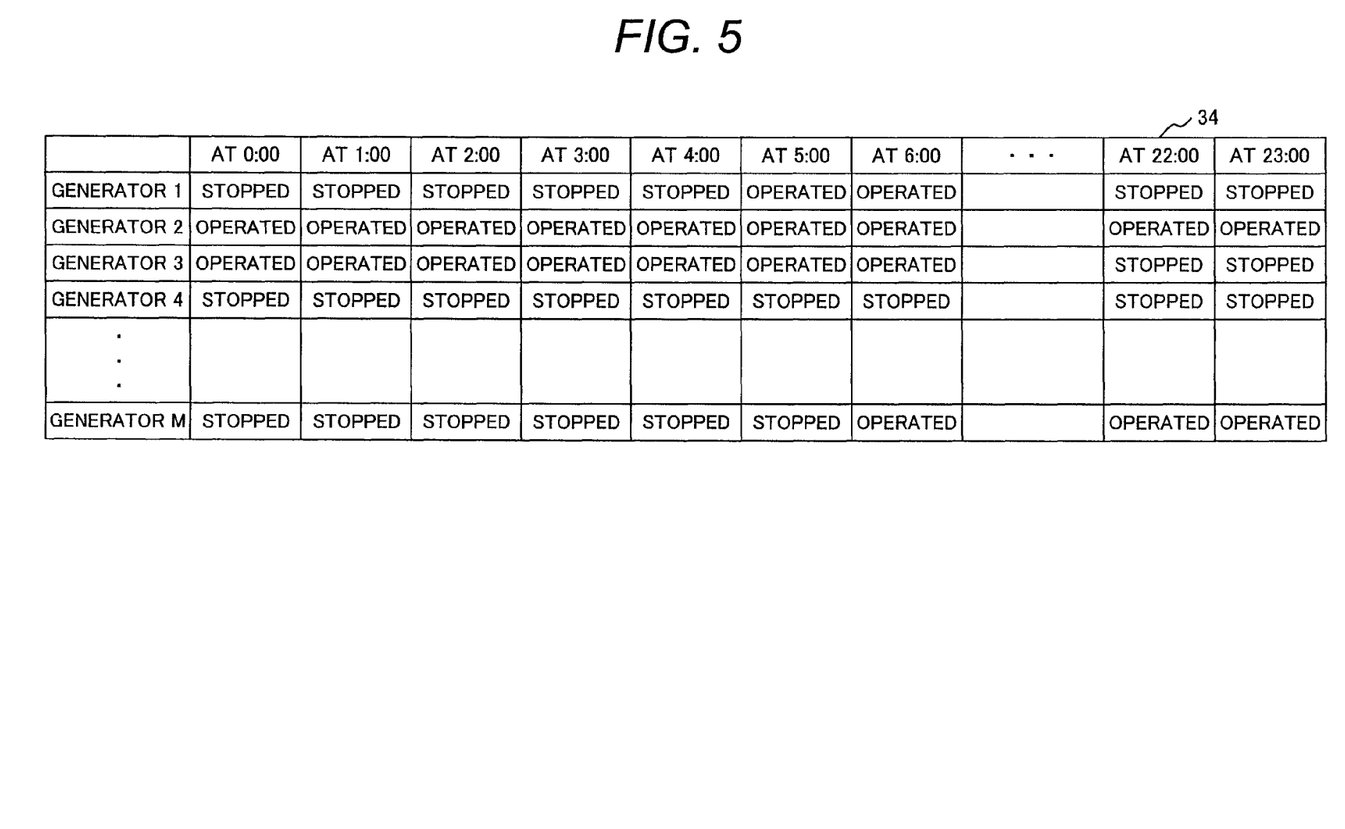
FIG. 5 is a diagram illustrating exemplary contents of a thermal/hydroelectric power generator operation planner 34.

FIGS. 3, 4, and 5 show exemplary stored contents of the generator management information 11, available wind turbine generator connection capability calculation information 32, and thermal/hydroelectric power generator operation planner 34, which stores or includes the basic information used for the execution of Equation (1). It should be noted, however, that the purpose can be achieved without acquiring the available wind turbine generator connection capability calculation information 32 and information stored in the thermal/hydroelectric power generator operation planner 34 when the current system information can be acquired from the automatic dispatching system 3.

The basic information necessary for the execution of Equation (1) includes the available wind turbine generator connection capability calculation information 32. As indicated by an example shown in FIG. 3, this information 32 is formed by supplied electrical power E and load L that are obtained daily at one-hour intervals between 0:00 and 23:00. As is the case with the daily load curve, a plurality of patterns (patterns 1 to N) are prepared. As for a next day's operation, a pattern closest to an actual pattern is selected in accordance, for instance, with of a current season and the temperature and other weather conditions of the next day and depending on whether the next day is a weekday or not. The patterns may be transmitted from the automatic dispatching system 3 or stored locally.

The allowable control deviation Emax and load fluctuation L in Equation (1) are derived from the available wind turbine generator connection capability calculation information 32. As these items of basic information include temporal elements, the allowable control deviation Emax and load fluctuation L prevailing at one-hour intervals on the next day are obtained.

The allowable control deviation can be calculated from the ratio to the total demand depending on the status of the power grid, which is received, for instance, from the automatic dispatching system 3. The load fluctuation is the fluctuation of the total demand. The fluctuation can be calculated in the automatic dispatching system 3 and received from the automatic dispatching system 3. Alternatively, the fluctuation can be calculated from stored information about the current status of the power grid, which is received from the automatic dispatching system 3.

The next basic information necessary for the execution of Equation (1) is the generator management information 11. As indicated by an example shown in FIG. 4, values (G1 to Gm) of electrical power generated by all generators (generators 1 to M) connected to the power grid are stored as the generator management information 11. As described in connection with Equation (1), the available control capability G is the amount of electrical power adjustment provided by the automatic frequency control (AFC) of the power grid and substantially equal to 5% of the amount of electrical power. Therefore, when the values of electrical power generated by the generators (generators 1 to M) are known, the available control capability G of each generator can be determined.

The available control capability is the control capability of a thermal/hydroelectric power generator, which generally performs a frequency-controlled operation. Further, the control capability of each generator is installation-specific information. Therefore, the available control capability can be preregistered as the generator management information 11. When the information about a generator performing a frequency-controlled operation is available to the current power grid, which receives information from the automatic dispatching system 3, its available control capability can be derived from the generator management information 11 and used for calculation purposes.

The next basic information necessary for the execution of Equation (1) is the information stored in the thermal/hydroelectric power generator operation planner 34. As indicated by an example shown in FIG. 5, the information stored in the thermal/hydroelectric power generator operation planner 34 represents daily unit commitments for all thermal/hydroelectric power generators (generators 1 to M) connected to the power grid and indicates whether the generators are operated or stopped at one-hour intervals between 0:00 and 23:00 . As indicated in FIG. 5, only generators 2 and 3 operate during a low demand period between 0:00 and 4:00; generator 1 additionally starts operating at 5:00 when the load is increased; and generator M further additionally starts operating at 6:00.

For the next day's operation of the power grid, the above-described generator management information 11, available wind turbine generator connection capability calculation information 32, and information in the thermal/hydroelectric power generator operation planner 34 are prepared in the renewable energy generation control system 8. The arithmetic unit 30 uses these items of information to acquire, on the current day, the pattern to be employed on the basis of the current time as well as the time-specific allowable control deviation Emax and load fluctuation L from the available wind turbine generator connection capability calculation information 32.

Further, the arithmetic unit 30 acquires the available control capability G of a running generator in accordance with the information about a generator running at the current time, which is derived from the information in the thermal/hydroelectric power generator operation planner 34, and with the current operation information about a thermal/hydroelectric power generator, which is directly received from the automatic dispatching system 3. Here, it is important that the available control capability G of each generator be derived from the information shown in FIGS. 4 and 5 at each point of time.

The arithmetic unit 30 calculates the currently available wind turbine generator connection capability of the power grid in accordance with the wind turbine generator fluctuation ratio R as well as the time-specific allowable control deviation Emax, load fluctuation L, and available control capability G, which are acquired as described above.

When the available wind turbine generator connection capability is calculated from Equation (1), it is important that the available control capability G be obtained as a signal that varies with time. When, for instance, a large number of thermal/hydroelectric power generators are operated to supply a relatively high demand during a day or a year, the available control capability G is increased. In reality, therefore, the available wind turbine generator connection capability can be increased.

The wind turbine generator side on which the wind turbine generators are distributively disposed and autonomously operated, however, does not know whether the system is currently provided with generators for supply and demand adjustment, such as thermal/hydroelectric power generators, or does not know the overall demand for the power grid. Therefore, the available control capability G in Equation (1) cannot be changed.

Hence, the renewable energy generation control system 8 for managing and controlling a plurality of wind turbine generators is allowed to retain the information about the available control capability concerning running thermal/hydroelectric power generators. The available control capability G of each time zone can be acquired by receiving a generator unit commitment at each point of time of the current day or the information about generators running at the current time from the automatic dispatching system or the like.

The renewable energy generation control system 8 can increase the available wind turbine generator connection capability, which has been defined for the assumably lightest load, in accordance with the supply and demand balance of the power grid by dynamically calculating the available wind turbine generator connection capability from the acquired information. Thus, the capability of a wind turbine generator connectable to the system can be increased in accordance with the assumably highest demand instead of light load.

In the present embodiment, the available control capability G is considered to be a temporal signal so that the maximum available wind turbine generator connection capability is obtained by determining the currently available wind turbine generator connection capability from the currently optimal available control capability G. Further, on the basis of the obtained maximum available wind turbine generator connection capability, the renewable energy generation control system 8 exercises power generation suppression control over wind turbine generators 5 to be monitored. This makes it possible to increase the electrical power generated by wind turbine generators connectable to the current power grid and make effective use of the wind turbine generators.

If the above-mentioned items of information cannot be acquired in real time from the automatic dispatching system 3, the arithmetic unit 30 accesses the available wind turbine generator connection capability calculation information 32 to acquire a pattern to be employed in accordance with the current time as well as the prevailing allowable control deviation and load fluctuation. Further, the arithmetic unit 30 can access the information in the thermal/hydroelectric power generator operation planner 34, identify a generator that is performing a frequency-controlled operation at the current time, and calculate the available control capability.

The available wind turbine generator connection capability of the current power grid can be calculated by using the allowable control deviation, load fluctuation, and available control capability acquired as described above and the wind turbine generator fluctuation ratio to be generally observed by each wind turbine generator.

When a target output value providing the available wind turbine generator connection capability is given to wind turbine generators 5 monitorable and controllable by the renewable energy generation control system in accordance with the above-mentioned currently available wind turbine generator connection capability, the electrical power generated by wind turbine generators connectable to the current power grid can increased or decreased. This makes it possible to maintain high power quality while making effective use of the wind turbine generators.

Figure 6:
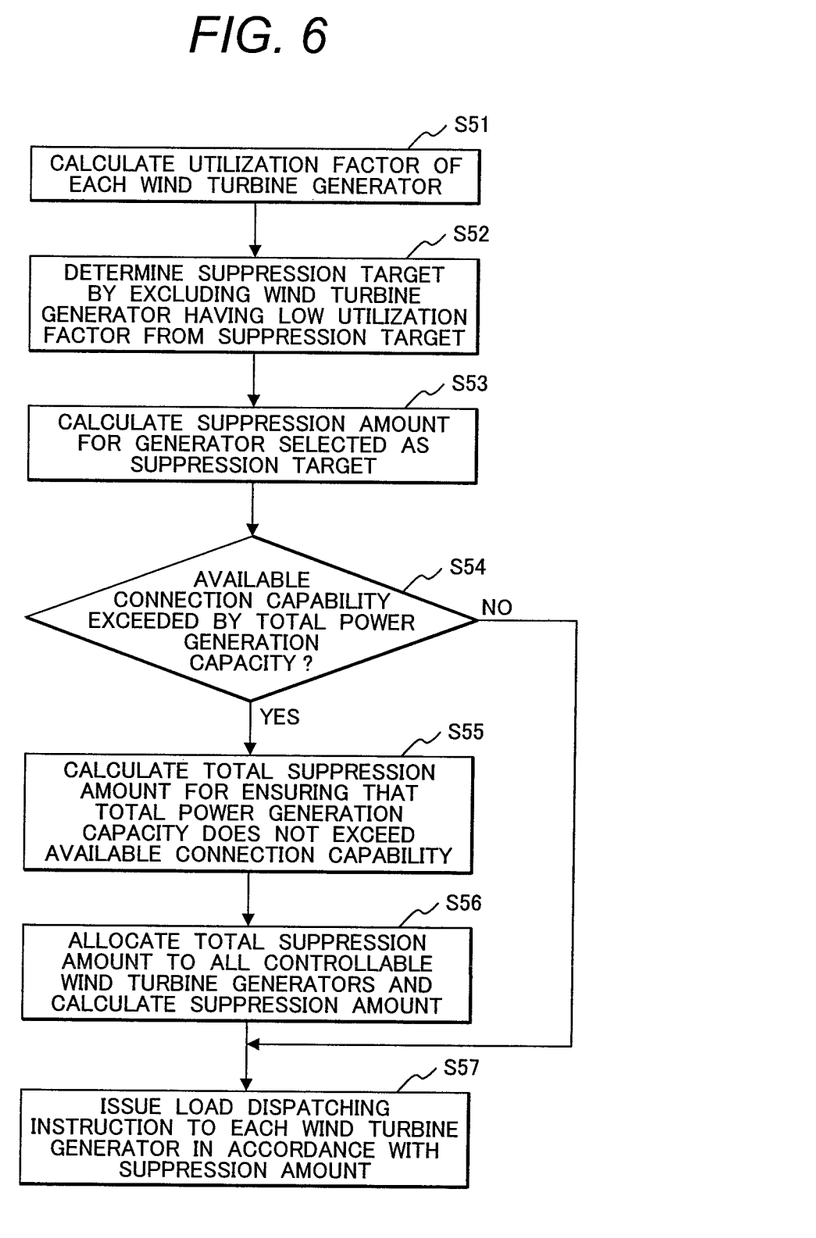
FIG. 6 is a flowchart illustrating an exemplary method of power generation suppression control for ensuring that the total power generation capacity of wind turbine generators 5 does not exceed an available wind turbine generator connection capability.

FIG. 6 is a flowchart illustrating an exemplary method of power generation suppression control that is exercised by the arithmetic unit 30 to ensure that the total power generation capacity of wind turbine generators 5 does not exceed the available wind turbine generator connection capability.

Referring to FIG. 6, which shows a series of processing steps, first of all, step S51 is performed to calculate the utilization factor of each wind turbine generator. The installation is efficiently used when each generator outputs electrical power close to its rated capacity. Therefore, the simplest way of calculating the utilization factor is to use Equation (2). Information necessary for utilization factor calculation is the past data about generated electrical power, which is derived from each wind turbine generator 5, collected by the data collection device, and stored in the result data storage device 29 of the renewable energy generation control system 8.

$$\text{Utilization factor} = \frac{\text{Electrical power generated during a predetermined period}}{\text{Rated capacity} \times \text{The number of hours of the predetermined period}} \quad (2)$$

In accordance with the utilization factor calculated in step S51, step S52 is performed to select a generator to be subjected to output suppression by excluding a wind turbine generator having the lowest utilization factor. The excluded wind turbine generator is excluded from a target of output suppression control according to the present embodiment and continuously operated to generate electrical power in accordance with wind conditions. In other words, the excluded wind turbine generator is excluded from a management target during its operation.

If the utilization factor difference between the wind turbine generators 5 is not greater than a threshold value, the generator to be subjected to output suppression can be selected from all the wind turbine generators. The output of each wind turbine generator is dependent on the wind conditions and affected by installation-site-specific seasonal and temporal changes. Therefore, the predetermined period in Equation (2) should be determined while considering the above-mentioned tendency and the current point of time.

If a particular wind turbine generator 5 is to be preferentially allowed to generate electrical power, a virtual utilization factor (Equation (3)) may be created by weighting its utilization factor in accordance with its priority. The wind turbine generator to be excluded from the target of output suppression control may then be selected in accordance with the virtual utilization factor.

$$\text{Virtual utilization factor} = \text{utilization factor} \times \text{weight} \quad (3)$$

Next, step S53 is performed to determine the amount of output suppression for the wind turbine generator 5 selected in step S52. Here, the method described in Japanese Patent No. 4559577 can be applied to steps S52 and S53. More specifically, the technology described in Japanese Patent No. 4559577 can be applied to a control method for selecting a generator exhibiting significant output changes from a plurality of wind turbine generators 5 and subjecting the selected generator to output suppression to smooth the power outputs of all the wind turbine generators. The method described in Japanese Patent No. 4559577 calculates the utilization factor of each wind turbine generator 5 that prevails during a predetermined period, and excludes any wind turbine generator having a utilization factor lower than a threshold value from output suppression to substantially equalize the utilization factors of all the wind turbine generators 5.

Next, step S54 is performed to calculate total electrical power assumably generated by the wind turbine generators 5 from the output suppression amount determined in step S53, and check that the calculated total electrical power has not exceeded the available wind turbine generator connection capability of the current system. More specifically, in a situation where, for instance, the power grid includes a total of ten wind turbine generators 5 and one of them is excluded from suppression as a wind turbine generator having a low utilization factor, step S54 is performed to handle the remaining nine wind turbine generators 5 as output suppression targets and check that the total electrical power generated by the ten wind turbine generators has not exceeded the available wind turbine generator connection capability (490 MW in the example indicated by Equation (1)).

If the available wind turbine generator connection capability is not exceeded, step S57 is performed to issue a load dispatching instruction to the target generators in accordance with the output suppression amount. If, on the other hand, available wind turbine generator connection capability is exceeded, step S55 is performed to calculate a total suppression amount required for ensuring that the assumably generated electrical power does not exceed the available wind turbine generator connection capability.

Next, step S56 is performed to allocate the total suppression amount to all the wind turbine generators as output suppression values. The allocation method to be used may, for example, preferentially select generators having a relatively high utilization factor, select generators that are currently generating a relatively large amount of electrical power, or proportionally distribute the total suppression amount to the generators in accordance with their rated capacities.

Finally, step S57 is performed to determine the electrical power to be generated by each generator in accordance with its suppression amount as described above and issue a load dispatching instruction to each generator.

To obtain an electrical power output close to the available wind turbine generator connection capability at all times, the present embodiment, which is configured as described above, ensures that the rated capacity of wind turbine generators connected to the power grid exceeds the available wind turbine generator connection capability, and subjects each wind turbine generator to output suppression so that the constantly changing total amount of generated electrical power is always less than the available wind turbine generator connection capability. As a result, the renewable energy flowing into the power grid can be always made close to the available wind turbine generator connection capability.

However, when a conventional method is employed so that individual wind turbine generators are operated in an autonomous distributed manner, control cannot be exercised to ensure that the total electrical power generated by the wind turbine generators is always less than the available wind turbine generator connection capability. Therefore, the renewable energy generation control system 8 capable of issuing an output suppression instruction to the wind turbine generators is installed to suppress the generated electrical power that flows from all the wind turbine generators to the power grid.

The control method described in Japanese Patent No. 4559577 effectively works to achieve the above-mentioned suppression. It is conceivable that the wind turbine generators may be installed by a plurality of different electrical power suppliers. However, when the method described in Japanese Patent No. 4559577 is used, wind turbine generators exhibiting significant output fluctuations are constantly subjected to output suppression. It means that only particular wind turbine generators are subjected to output suppression. Hence, the utilization factors (the maximum electrical power generation amount based on the generated electrical power/rated capacity) of all the wind turbine generators cannot be equalized. As such being the case, the utilization factors of all the wind turbine generators can be substantially equalized by preferentially selecting wind turbine generators having a relatively high utilization factor and subjecting them to output suppression.

If the wind turbine generators 5 generate electrical power in accordance with the wind conditions when a target output value providing the available wind turbine generator connection capability is to be calculated for each wind turbine generator to be operated, the wind turbine generator fluctuation ratio, which is given as a target, may be exceeded. In this instance, the present embodiment allows only one of the wind turbine generators 5 to receive a target value and ensures that the wind turbine generator fluctuation ratio of the total electrical power generated by that wind turbine generator satisfies the target value. The generation of a target value that subjects each wind turbine generator 5 to output suppression can then be avoided wherever possible. In other words, the wind turbine generator fluctuation ratio should be managed for all the wind turbine generators so as to avoid the output suppression of individual generators wherever possible.

Further, when the available wind turbine generator connection capability is to be calculated in a situation where the wind turbine generators 5 connected to the power grid vary in output fluctuation ratio from one unit to another, a wind turbine generator 5 exhibiting the highest output fluctuation ratio is selected. However, if any wind turbine generator is operating at a lower output fluctuation ratio, the output fluctuation ratio used to calculate the available wind turbine generator connection capability is given to such a wind turbine generator as a target value. Alternatively, a target power generation value satisfying the output fluctuation ratio may be given to such a wind turbine generator as an instruction value.

As a result, the wind turbine generators 5 can be more effectively used without subjecting them to unnecessary output fluctuation suppression. Further, if wind turbine generators 5 currently connected to the system for power generation purposes have a small capacity, it is possible to increase their output fluctuation ratio, decrease their output fluctuation suppression amount, and use them with increased efficiency.

In general, the wind turbine generators 5 are often operated at a capacity lower than the rated capacity depending on the wind conditions. Therefore, even when the capacity of wind turbine generators 5 connected to the power grid is equal to the available wind turbine generator connection capability, the amount of electrical power that is generated by the wind turbine generators 5 and flows into the power grid is often smaller than the available wind turbine generator connection capability.

Therefore, the rated capacity of the wind turbine generators 5 connected to the power grid is made not less than the available wind turbine generator connection capability. Further, a target electrical power generation amount is given to each wind turbine generator 5 so that the total electrical power generated by the wind turbine generators 5 remains not greater than the available wind turbine generator connection capability. As a result, the amount of electrical power that is generated by the renewable energy and flows into the power grid is close to the available wind turbine generator connection capability.

When the target electrical power generation amount of each wind turbine generator 5 is to be determined, the wind turbine generators to be subjected to output suppression are selected so that the suppression amounts of a plurality of or all of the wind turbine generators are determined in accordance with the weight applied to static or dynamic calculation.

The technology described in Japanese Patent No. 4559577 can be applied to a control method for selecting a generator exhibiting a significant output fluctuation from a plurality of wind turbine generators 5 and subjecting the selected generator to output suppression to smooth the power outputs of all the wind turbine generators.

Further, one alternative would be, for example, to select a wind turbine generator 5 that can be suppressed most effectively, in accordance with the assumably generated electrical power that is generated when inhibition estimated according to wind velocity data is not provided. Another alternative would be to make a selection in accordance with the past utilization factors of the wind turbine generators 5 by decreasing the weight applied to a generator having a low utilization factor. Still another alternative would be to provide proportional distribution in accordance with the rated capacities of the wind turbine generators 5.

Referring to FIG. 2, which illustrates the power grid operation control system, a system fault and the recovery from such a fault will now be described in connection with relevant operations performed in a coordinated manner by the automatic dispatching system 3 and the renewable energy generation control system 8.

Referring again to FIG. 2, if a generator facility fault or a transmission facility fault occurs in the power grid, the automatic dispatching system 3, which monitors and controls the entire power grid, identifies loads (users) affected by a power outage caused by the fault and its influence, and issues a restoration instruction or performs an restoration operation for the fault.

It is now assumed, for example, that the system frequency is significantly decreased due to insufficient electrical power supply to the power grid in the event of a facility fault in the thermal/hydroelectric power generators or the system frequency is significantly increased due to excessive electrical power supply to the power grid in the event of a power outage for some loads (users), which is caused by a transmission facility fault.

In the above-mentioned case, a commonly used procedure was to isolate the wind turbine generators 5 and photovoltaic power generation 6, whose output varies with the weather conditions, from the power grid for the purpose of preventing electrical power generation during a subsequent restoration from being disturbed.

However, if the wind turbine generators 5 and photovoltaic power generation 6 are isolated from the power grid upon detection of a significant decrease in the system frequency in the event of a generator facility fault, the supply of electrical power generated by the wind turbine generators 5 and photovoltaic power generation 6 is shut off to further increase the amount of generated electrical power deficiency in the power grid. This causes a stability control system to disconnect loads (users), thereby expanding the area of power outage.

To address the above problem, the present embodiment causes the automatic dispatching system 3 to inform the renewable energy generation control system 8 that a fault has occurred in the power grid. The renewable energy generation control system 8 stores the received information in a unit that handles the system fault management information 31. If the supply of generated electrical power is excessive, the renewable energy generation control system 8 issues an instruction for isolating the wind turbine generators 5 and photovoltaic power generation 6 from the power grid to the controllers 15, 23 for the wind turbine generators 5 and photovoltaic power generation 6. If, on the other hand, the supply of generated electrical power is insufficient, the renewable energy generation control system 8 generates electrical power generation insufficiency information and issues a maximum output instruction. Upon receipt of the electrical power generation insufficiency information and maximum output instruction, the controllers 15, 23 for the wind turbine generators 5 and photovoltaic power generation 6 use the attached energy storage batteries to perform a fixed output discharge operation at full power.

When the deficiency of generated electrical power is compensated for by the thermal/hydroelectric power generators 2 and the restoration of power supply to the loads (users) affected by the power outage is completed, the power grid is restored to a normal state that prevailed before the occurrence of the fault. Upon receipt of restoration completion information from the automatic dispatching system 3, the renewable energy generation control system deletes the relevant fault information from the system fault management information 31 and terminates the transmission of electrical power generation insufficiency information and maximum output instruction to the wind turbine generators 5 and photovoltaic power generation 6. This enables the renewable energy generation control system to issue a normal load dispatching instruction so that the wind turbine generators 5 and photovoltaic power generation 6 revert to a normal operating state.

If the energy storage batteries for the wind turbine generators 5 and photovoltaic power generation 6 are about to become exhausted while the power grid is being restored to a normal state that prevailed before the occurrence of the fault, the energy storage batteries can gradually stops its output to ensure that the restoration in the automatic dispatching system 3 remains unobstructed.

It should be understood by those skilled in the art that various modifications, combinations, sub-combinations, and alterations may occur depending on design requirements and other factors insofar as they are within the scope of the appended claims or the equivalents thereof.

What is claimed is:

1. A power grid operation control system for a power grid connected to a plurality of renewable energy power generators and a plurality of thermal/hydroelectric power generators, the power grid operation control system comprising:
   an automatic dispatching system that controls the thermal/hydroelectric power generators; and
   a renewable energy generation control system that controls the renewable energy power generators;
   wherein the automatic dispatching system controls the thermal/hydroelectric power generators by generating an automatic frequency control signal for correcting the power supply and demand imbalance of the power grid; and
   wherein the renewable energy generation control system determines an available connection capability, which is the power generation capacity of the renewable energy power generators connectable to the power grid and which varies with time, by taking into account a fluctuation of the load, a renewable energy generator fluctuation ratio, and the system capacity providable by the thermal/hydroelectric power generators, issues individual load dispatching instructions to the renewable energy power generators to ensure that the total power generation capacity of the renewable energy power generators does not exceed the available connection capability, and acquires basic information for determining the available connection capability in coordination with the automatic dispatching system.

2. The power grid operation control system according to claim 1, wherein the renewable energy generation control system stops the renewable energy power generators upon receipt of information about a fault in the power grid from the automatic dispatching system, and when the electrical power supplied from the power grid is insufficient, exercises fixed output discharge control with energy storage batteries provided for the renewable energy power generators.

3. A power grid operation control device for a power grid connected to a plurality of generators based on renewable energy and thermal/hydroelectric power generators whose electrical power generation is controlled when a frequency control signal based on power supply and demand imbalance is received from an automatic dispatching system, each of the generators based on renewable energy being equipped with a controller that controls the electrical power generation thereof, the power grid operation control device comprising:
   a renewable energy generation control system that issues a load dispatching instruction to the controller;
   wherein the renewable energy generation control system includes
   a first unit that determines an available connection capability, which is the power generation capacity of the generators based on the renewable energy connectable to the power grid and which varies with time, by taking into account a fluctuation of the load, a renewable energy generator fluctuation ratio, and the system capacity providable by the thermal/hydroelectric power generators, and a second unit that, when the total power generation capacity of the generators based on the renewable energy connected to the power grid is not lower than the available connection capability, issues the load dispatching instruction to the generators based on the renewable energy to ensure that the total power generation capacity does not exceed the available connection capability.

4. The power grid operation control device according to claim 3, wherein basic information for enabling the first unit to determine the available connection capability is acquired as time zone specific information about a daily operation.

5. The power grid operation control device according to claim 4, wherein the basic information includes an available control capability, which is an output adjustment range of the thermal/hydroelectric power generators whose output can be changed by the load dispatching instruction based on a frequency control signal, and is acquired as the time zone specific information about a daily operation.

6. The power grid operation control device according to any one of claims 3 to 5, wherein the utilization factor of each of the generators based on the renewable energy that prevails during a predetermined period is calculated to operate generators other than a generator having a low utilization factor in such a manner that the total power generation capacity does not exceed the available connection capability.

7. A power grid operation control method for a power grid connected to a plurality of generators based on renewable energy and thermal/hydroelectric power generators whose electrical power generation is controlled by a frequency control signal based on power supply and demand imbalance, the power grid operation control method comprising the steps of:

determining an available connection capability, which is the power generation capacity of the generators based on the renewable energy connectable to the power grid and which varies with time, by taking into account a fluctuation of the load, a renewable energy generator fluctuation ratio, and the system capacity providable by the thermal/hydroelectric power generators; and controlling the generators based on the renewable energy connected to the power grid by determining individual load dispatching instructions for ensuring that the total power generation capacity of the generators based on the renewable energy does not exceed the available connection capability.

* * * * *